US011265839B2

(12) United States Patent
Matolia et al.

(10) Patent No.: US 11,265,839 B2
(45) Date of Patent: Mar. 1, 2022

(54) AVOIDING SUBSCRIBER IDENTITY MODULE INVALIDATION

(71) Applicant: Apple Inc., Cupertino, CA (US)

(72) Inventors: Rohit R. Matolia, Surat (IN); Vijay Venkataraman, San Jose, CA (US); Alosious Pradeep Prabhakar, Singapore (SG); Lakshmi N. Kavuri, Cupertino, CA (US); Srinivasan Vasudevan, Sunnyvale, CA (US); Vijay Kumar Jha, Vikhroli East (IN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/079,232

(22) Filed: Oct. 23, 2020

(65) Prior Publication Data

US 2021/0243715 A1  Aug. 5, 2021

(30) Foreign Application Priority Data

Feb. 4, 2020  (IN) .............................. 202041004774

(51) Int. Cl.
*H04W 60/04* (2009.01)
*H04W 8/18* (2009.01)
*H04W 48/02* (2009.01)
*H04W 88/02* (2009.01)

(52) U.S. Cl.
CPC ........... *H04W 60/04* (2013.01); *H04W 8/183* (2013.01); *H04W 48/02* (2013.01); *H04W 88/02* (2013.01)

(58) Field of Classification Search
CPC ..... H04W 60/04; H04W 8/183; H04W 48/02; H04W 88/02
USPC ....................................................... 455/432.1
See application file for complete search history.

(56) References Cited

U.S. PATENT DOCUMENTS

| 9,826,104 | B2 | 11/2017 | Devarayanigari et al. |
| 10,045,260 | B2 | 8/2018 | Li et al. |
| 10,143,029 | B2 | 11/2018 | Behera et al. |
| 2016/0205650 | A1* | 7/2016 | Devarayanigari ...... H04W 8/18 455/435.1 |
| 2016/0255674 | A1* | 9/2016 | Niemi .................... H04W 60/04 455/435.1 |
| 2016/0373928 | A1* | 12/2016 | Devarayanigari .... H04L 67/303 |
| 2017/0215132 | A1* | 7/2017 | Moisanen ............. H04B 7/0613 |
| 2019/0380157 | A1* | 12/2019 | Mori ..................... H04W 48/20 |
| 2021/0051577 | A1* | 2/2021 | Won ...................... H04W 48/16 |

* cited by examiner

*Primary Examiner* — Hirdepal Singh
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment device (UE) and/or cellular network to avoid invalidation of a subscriber identity module (SIM). A UE may initiate a connection with the network. The network may reject the connection attempt. The UE may selectively determine whether to invalidate the SIM, network, or both. The UE may consider various factors such as details of the connection rejection message, identity of the network, its relationship to the network (e.g., whether the network is a preferred network, etc.), a number of connection rejections received, time remaining on one or more timers, availability of other networks, etc.

20 Claims, 10 Drawing Sheets

AVOIDING SUBSCRIBER IDENTITY MODULE INVALIDATION

PRIORITY CLAIM

This application claims benefit of priority to Indian Application No. 202041004774, titled "Avoiding Subscriber Identity Module Invalidation", filed Feb. 4, 2020, which is hereby incorporated by reference in its entirety as though fully and completely set forth herein.

TECHNICAL FIELD

The present application relates to wireless devices, and more particularly to apparatuses, systems, and methods for avoiding invalidation of a subscriber identity module (SIM).

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

In some instances, a UE may receive a message (e.g., a rejection) indicating a SIM of the device is invalid. Invalidating a SIM may present security risks and/or negatively impact the performance of a UE. Accordingly, improvements in the field may be desired.

SUMMARY

Techniques, apparatuses, systems, and methods are disclosed for a user equipment device (UE) and cellular network to avoid SIM invalidation. A UE may attempt to connect to a network using a SIM, and the network may reject the connection. In response to the connection rejection, the UE may make a selective determination of whether or how to invalidate or block the SIM, network, or both. The UE may consider various factors such as details of the connection rejection message, identity of the network, its relationship to the network (e.g., whether the network is a preferred network, etc.), a number of connection rejections received, time remaining on one or more timers, availability of other networks, etc.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
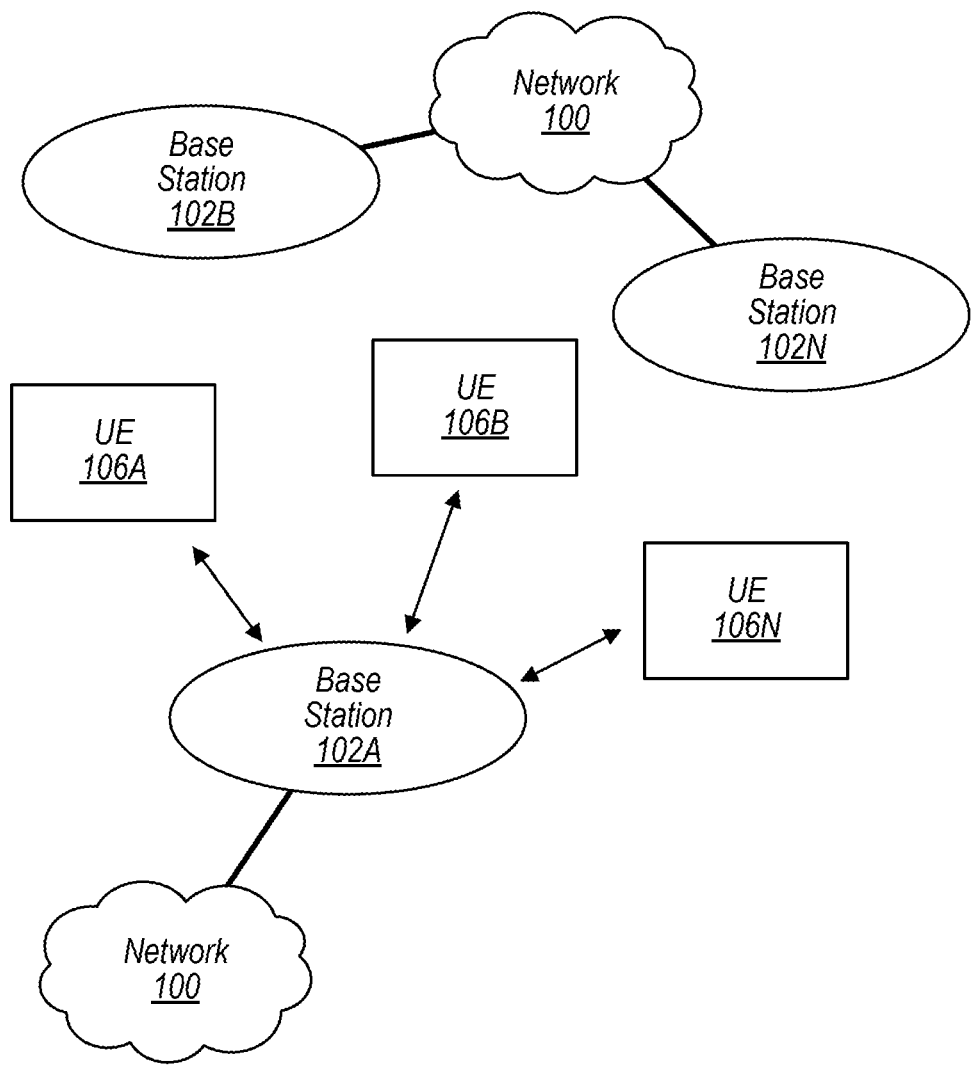
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms may be used in the present Patent Application:
UE: User Equipment
BS: Base Station
gNB: gNodeB (Base Station)
NR: new radio
LTE: Long Term Evolution
VoLTE: voice over LTE
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway
PS: Packet-Switched
CS: Circuit-Switched
EPS: Evolved Packet-Switched System
RRC: Radio Resource Control
IE: Information Element
UL: uplink
DL: downlink
RS: reference signal
PLMN: Public Land Mobile Network
EHPLMN: equivalent home PLMN
PPLMN: preferred PLMN
OPLMN: operator preferred PLMN
UPLMN: user preferred PLMN
NRP: National Roaming Partnership
NW: network

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
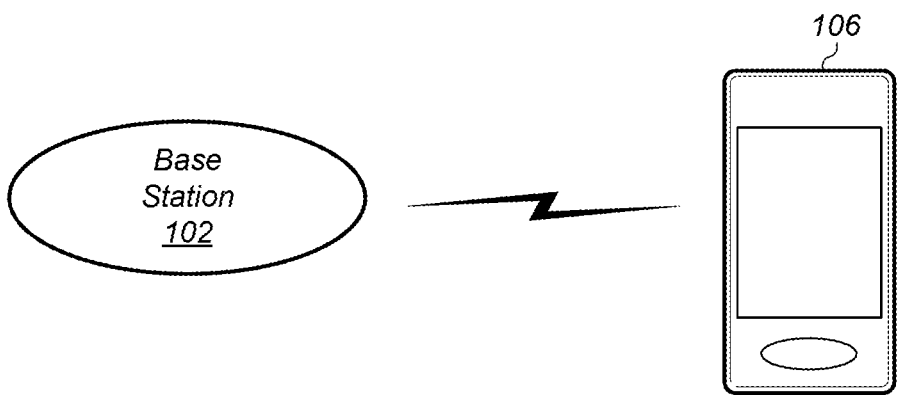
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

In some embodiments, UE 106 may communicate (e.g., concurrently) with multiple BS 102s. One or more BS 102s may make up a radio access network (RAN).

Figure 3:
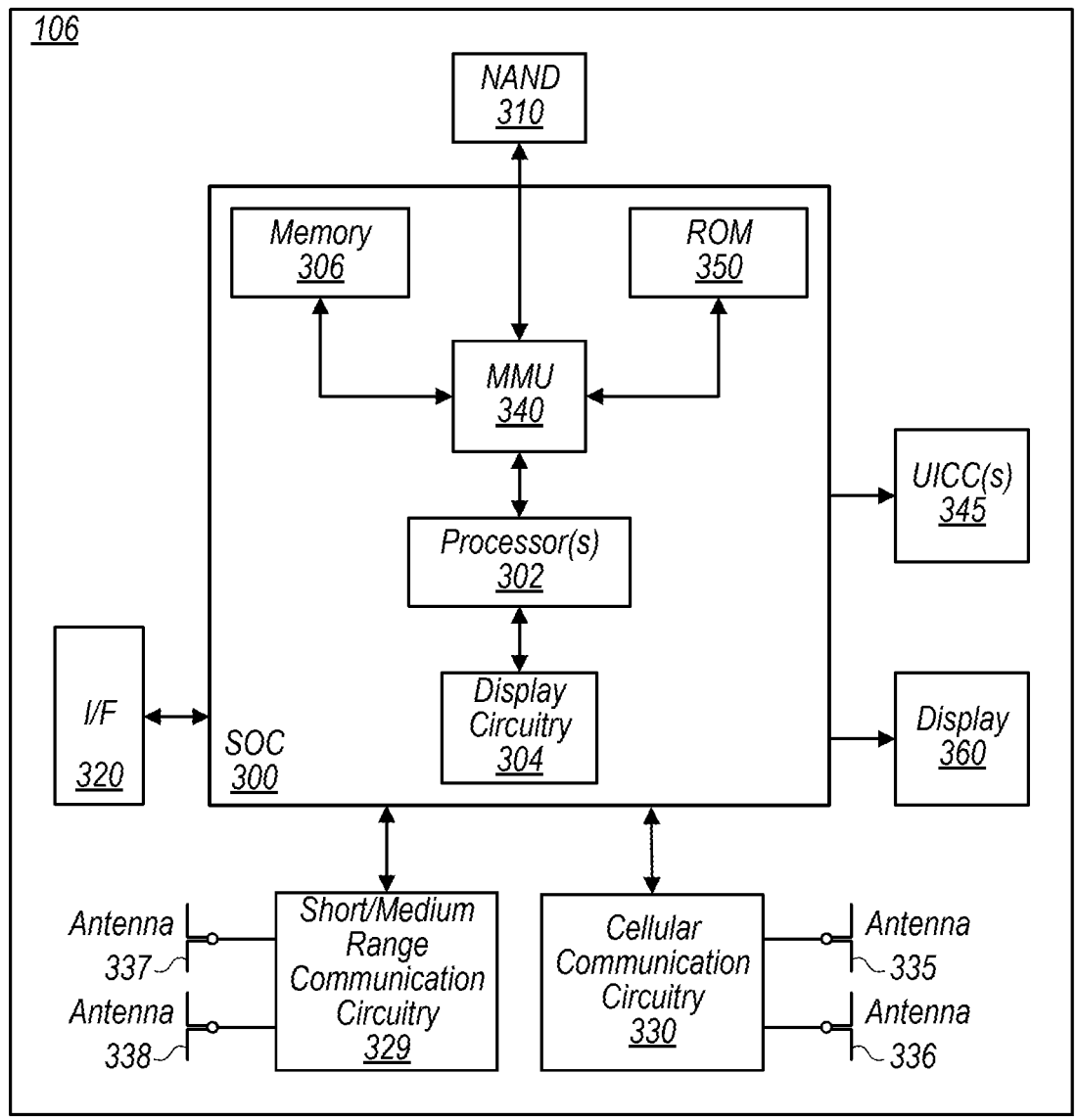
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module (SIM)) functionality, such as one or more UICC(s) (Universal Integrated Circuit Card(s)) cards 345. It will be appreciated that the device 106 may include more than one SIM, according to some embodiments. In some embodiments, the device 106 may be configured to determine whether to invalidate a SIM. In some embodiments, the device 106 may be able to switch from one SIM to another, e.g., based on a change in location, user input, invalidation of a SIM, etc. Various types of SIMs may be referred to simply as SIMs, as used herein. For example, a USIM may be referred to as a SIM.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector OF 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
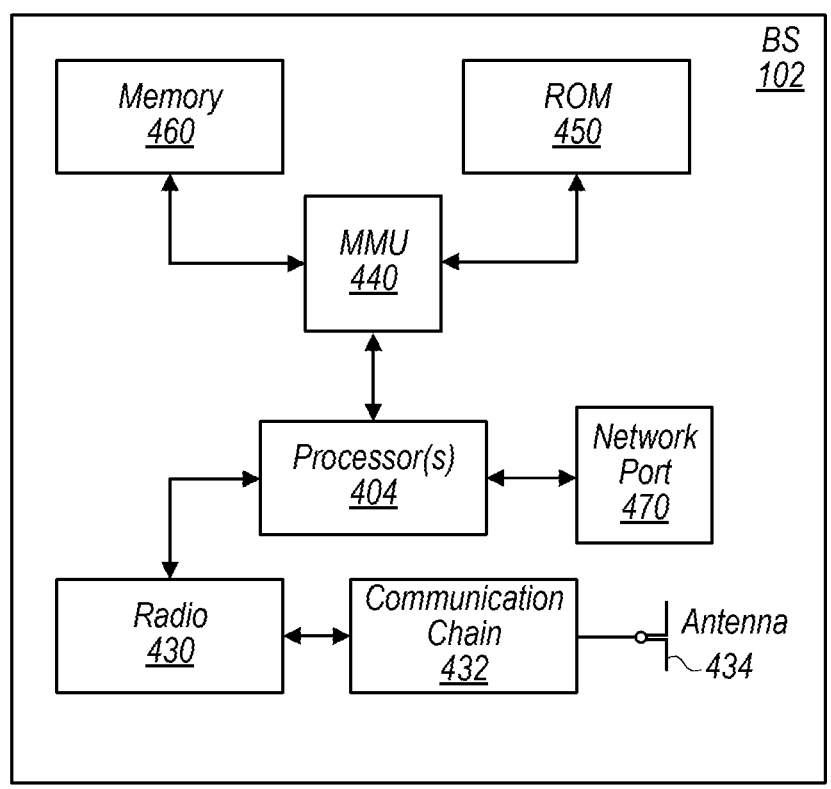
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

In some embodiments, a BS 102 may provide access to a cellular network via a 3GPP access and/or a non-3GPP access. In some embodiments, a BS 102 that provides a non-3GPP access may be referred to as an access point.

Figure 5:
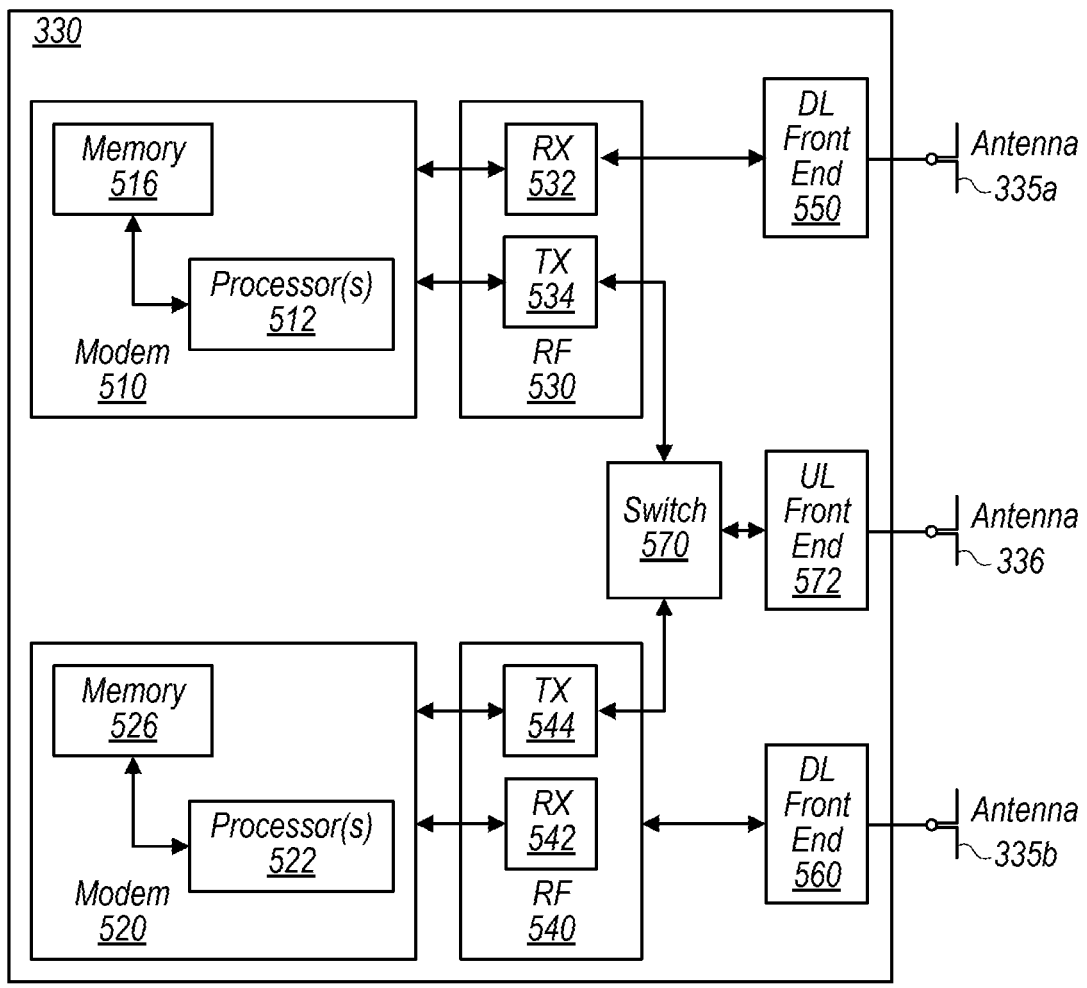
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch (e.g., and/or combiner, multiplexer, etc.) 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, modem 510 and modem 520 may be configured to transmit at the same time, receive at the same time, and/or transmit and receive at the same time. Thus, when cellular communication circuitry 330 receives instructions to transmit according to both the first RAT (e.g., as supported via modem 510) and the second RAT (e.g., as supported via modem 520), combiner 570 may be switched to a third state that allows modems 510 and 520 to transmit signals according to the first and second RATs (e.g., via a transmit circuitry 534 and 544 and UL front end 572). In other words, the modems may coordinate communication activity, and each may perform transmit and/or receive functions at any time, as desired.

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
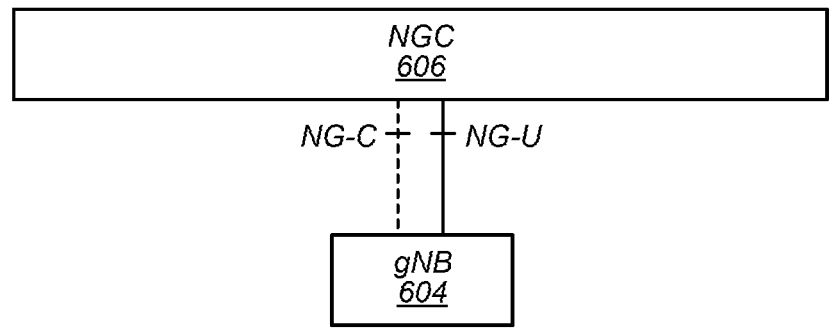
FIGS. 6 and 7 illustrate examples of a 5G NR base station (gNB), according to some embodiments.
Figure 7:
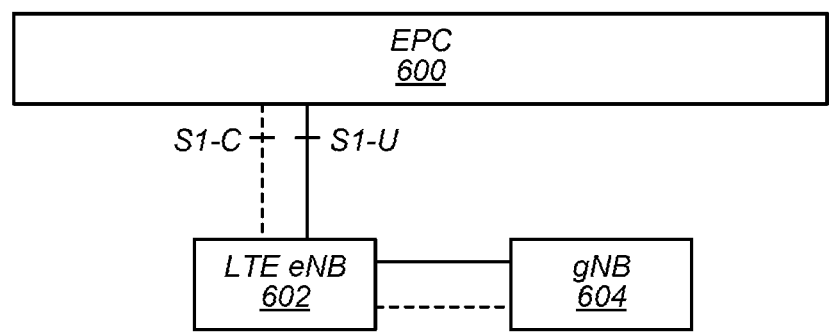

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
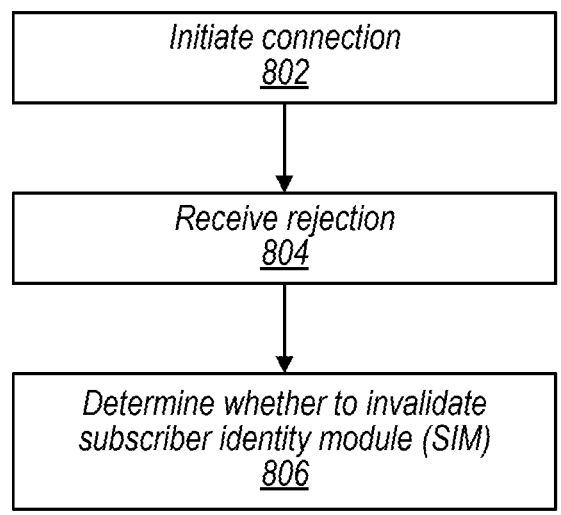
FIG. 8 illustrates an example method of avoiding SIM invalidation, according to some embodiments.

FIG. 8—Avoiding Subscriber Identity Module (SIM) Invalidation

In some embodiments, a network (e.g., a non-home network of a UE) may reject a connection request of a UE (e.g., during authentication and/or attach procedures, among various possibilities). Some connection rejections (e.g., an authentication rejection such as a non-access stratum (NAS) rejection, Tracking Area Update (TAU) rejection, registration rejection (e.g., according to 5G NR) and/or an attach rejection with cause 2, 3, 6, 7, or 8, among various possibilities) may indicate that a SIM of the UE is invalid. If the UE determines that a SIM is invalid, e.g., based on such a message, the UE may enter a limited service or no service state for an extended period of time (e.g., until reboot of the UE, removal of the SIM, or 12 to 24 hours, among various possibilities). The UE may remain in this limited service state even if service is available on other networks (e.g., potentially other networks which would validate the SIM, thus allowing the UE to access services over such networks). Example scenarios of SIM invalidation are provided below.

In a first example, scenario, a user, who may be a very important person (VIP) (e.g., a government executive, etc.), may have a special privilege SIM card, and may travel to different destinations (e.g., countries with different networks). These SIM cards may have special privilege to provide service in many domestic and international carriers, even without normal end user roaming agreement. However, the special privilege SIM card may be rejected by a non-home location network. In case the special privilege SIM becomes invalid due to a NAS (or other) rejection, the special privilege SIM can be revalidated only after a reboot/power cycle of the UE. In some embodiments, after a rejection, manual selection of a public land mobile network (PLMN) may also not work for those SIM privilege cards. In some embodiments, a SIM may have an access identity. For example, an access identity 1 may be associated with multimedia priority service and an access identity 2 may be associated with a mission critical service (e.g., for voice calls). A special privilege SIM may be associated with access identity 1 and/or 2, according to some embodiments. Such special privilege SIMs may be configured to prioritize providing a requested service, e.g., without regard to network (e.g., whether the network used is a home or roaming network). SIMs of most UEs may be associated with other access identities (e.g., 11-15). Access identities may be discussed 3GPP technical specification (TS) 24.501, e.g., Table 4.5.2.1.

A second example scenario may illustrate the potential security risk of receiving an authentication rejection in a rogue/test network. For example, for any of various reasons (e.g., trade tensions, issues or security concerns with a particular manufacturer, etc.) a network may reject authentication of a UE associated with another carrier (e.g., a roaming UE). Similarly, a rogue or test network may reject an authentication. This rejection may cause SIM invalidation, and thus the device may need to be rebooted or power cycled to get service. This can also be used as denial of service (DOS) attack alternative, e.g., by causing a roaming user to experience no or limited service. In other words, a test/rogue network may cause SIM invalidation thus causing a UE to stay in limited service and not attempting to gain full service.

A third example scenario may illustrate roaming rejections due to changing roaming agreements, e.g., leading to problems in connection or authentication rejection. Due to continuous updating in international and/or domestic roaming agreements (e.g., with some mature networks and some upgrading networks), various temporary outages and/or service issues may occur. For example, some network elements may be temporarily disabled. For example, one network may not be able to connect to a server of another network to verify subscriber (e.g., SIM) information associated with a connecting UE. Thus, some NAS rejections (e.g., or indicated causes) and/or authentication rejections may be due to such temporary outages, updating of components to reflect changing roaming agreements, etc. Thus, such updates may result in a roaming UE invalidating a SIM and entering a no/limited service state as discussed above.

In all of the example scenarios discussed above, among others, one negative impact is that UEs (e.g., including UEs of VIPs with special privilege SIMs or other roaming users) may experience a limited service or no service state for an extended period of time. Further, it may be relatively easy for a rogue or test network to cause a DOS event, e.g., causing a roaming UE (e.g., from a National Roaming Partnership (NRP) network) to enter and stay in a limited/no service state. FIG. 8 illustrates an approach to handling the above scenarios (and other scenarios) for a better, more secure and more robust design including selective invalidation of a SIM.

FIG. 8 is a flow chart diagram illustrating an example method of avoiding SIM invalidation, according to some embodiments. Aspects of the method of FIG. 8 may be implemented by a UE 106 in communication with a cellular network 100 (e.g., including one or more BS 102), as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, such as an AMF, etc.), may cause the UE, base station, and/or network element(s) to perform some or all of the illustrated method elements. For example, a baseband processor or application processor of the UE may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may attempt to access or initiate a connection with a network 100 (e.g. a PLMN, which may operate according to cellular standards such as NR) (802), according to some embodiments. In some embodiments, the network may not be a home network of the UE; e.g., the UE may be roaming. The UE and network may exchange one or more messages in the uplink and/or downlink directions. For example, the UE may receive one or more broadcasts of the network, e.g., master information block (MIB), system information block (SIB), etc. The UE may use a SIM to indicate its identity to the network; e.g., the UE may transmit one or more message including identifying information related to the SIM, such as an international mobile subscriber identity (IMSI) and/or other identifier(s). Further, the UE and network may exchange connection establishment messages such as: radio resource control (RRC) connection, configuration and/or reconfiguration; access stratum (AS) request, security mode command (SMC), and AS SMC complete (e.g., establishing AS security); registration request and registration accept; non-access stratum (NAS) request etc.

The network 100 may reject the UE's connection and may transmit a connection rejection message which the UE 106 may receive (804), according to some embodiments. The connection rejection message may indicate or imply that the network has found a SIM and/or the UE to be invalid (e.g., a SIM invalidating rejection). The connection rejection may be an authentication rejection, an attach rejection, or any other type of connection rejection. For example, the connection rejection may be received in response to an attach request or a NAS authentication request, among various possibilities. An attach rejection may of types 2, 3, 6, 7, or 8 may indicate or imply invalidation of a SIM, among various possibilities. Similarly, an authentication rejection may indicate or imply invalidation of a SIM, among various possibilities. The UE may start one or more timers associated with a connection rejection. Such a timer may be an invalidation timer, e.g., associated with a time period that a SIM may be considered invalid (e.g., and not used) following the connection rejection, among various possibilities.

The UE may selectively determine whether (e.g., and/or how) to invalidate the SIM and/or network (806), according to some embodiments. Among various factors, the UE may consider details of the connection rejection message, identity of the network, the relationship of the SIM to the network (e.g., whether the network is a preferred PLMN (PPLMN), etc.), characteristics of the SIM (e.g., access identity, whether the device is associated with a non-public network (NPN)), a number of connection rejections received, time remaining on one or more timers (e.g., or whether the timer(s) has expired, e.g., such timer(s) may be associated with invalidating a SIM), availability of other networks, etc. The UE may determine to not invalidate a SIM, invalidate a SIM and a network together (e.g., blocking the network for further connection attempts with that SIM), block a network outright (e.g., blocking further connection attempts with any SIM), and/or invalidate a SIM (e.g., blocking any further connection attempts with that SIM), among various possibilities. For example, following a determination not to invalidate a first SIM (e.g., notwithstanding a connection rejection that may indicate invalidation of the first SIM), the UE may continue to use the first SIM as a valid SIM (e.g., while an invalidation timer is pending). For example, the UE may continue to use the first SIM (e.g., while the invalidation timer is pending) to attempt to gain access to a network (e.g., the same network or a different network).

FIGS. 9-12—Avoiding SIM Invalidation

FIGS. 9-15 are diagrams illustrating examples of the method of FIG. 8, according to some embodiments. It will be appreciated that these figures may be examples of the method of FIG. 8, but these examples are not limiting. In various embodiments, some of the elements shown may be performed concurrently, in a different order than shown, may be substituted for by other elements, or may be omitted. Additional elements may also be performed as desired.

Figure 9:
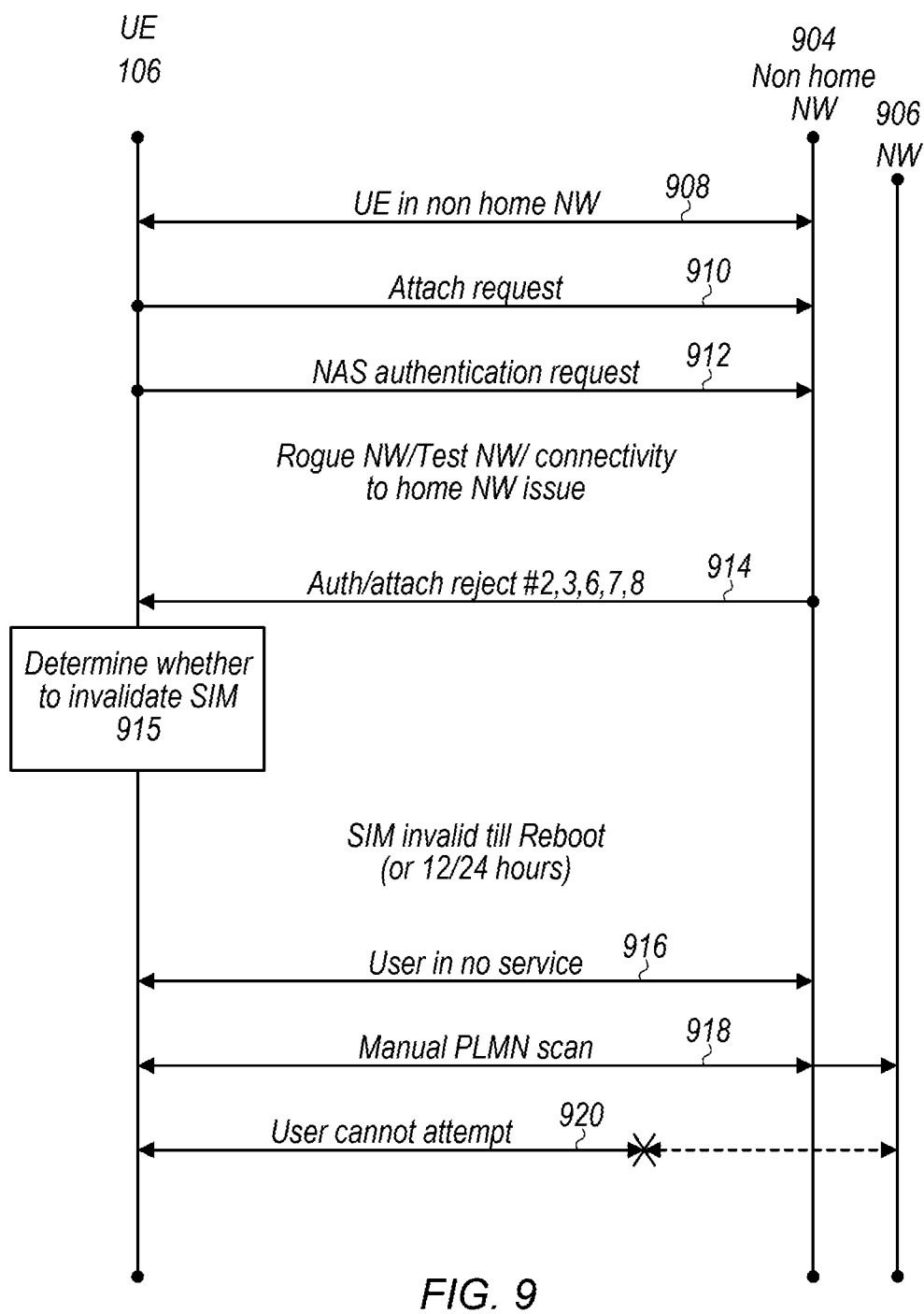
FIGS. 9-12 illustrate exemplary aspects of avoiding SIM invalidation, according to some embodiments.

As shown in FIG. 9, a UE (e.g., UE 106) may be in communicative range of a non-home network 904 and a second network 906. Both networks 904 and 906 may be examples of network 100. FIG. 9 illustrates a scenario of SIM invalidating due to a NAS rejection or authentication rejection in a non-home NW, according to some embodiments.

The UE may determine that it is in communicative range of non-home NW 904 (906), according to some embodiments. For example, the UE may determine that it can detect broadcast messages (e.g., master information block (MIB), system information block (SIB), etc.) of non-home network 906. The UE may further determine that a home network is unavailable at its location (e.g., or that signal strength and/or quality of a home network is below a threshold).

The UE may initiate a connection with the network (910), e.g., as described above with respect to 802. For example, the UE may transmit an attach request (e.g., or a register request, etc.) to the non-home NW 904. In some embodiments, the UE may also transmit a NAS authentication request to the non-home NW 904 (912).

The non-home NW 904 may reject one or more messages associated with the UE's connection request (914), e.g., as described above with respect to 804. For example, the non-home NW 904 may transmit an authentication rejection in response to the NAS authentication request and/or an attach rejection in response to the attach request, among various possibilities. Such an attach rejection may include cause code 2, 3, 6, 7, or 8, among various possibilities.

The network may reject the connection request message for any of various reasons. For example, the network may be a rogue network or test network, e.g., which may not be configured to accept connect requests. Similarly, the network may not be able to verify SIM information of the UE, potentially due to an ongoing outage or connectivity issue associated with the non-home NW 904 or associated with a home NW of the UE.

The UE may selectively determine whether to invalidate a SIM in response to the rejection (915), e.g., as described above with respect to 806. For purposes of example, FIG. 9 illustrates the scenario that the UE does invalidate the SIM. Thus, the SIM may be invalid and the UE may be in a no service or limited service state (916) for a period of time (e.g., until reboot of the UE, removal of the SIM, or 12 to 24 hours, among various possibilities), according to some embodiments.

During this period of time, the UE may perform (e.g., automatically and/or in response to user input) one or more PLMN scans (918), according to some embodiments. In other words, the UE may attempt to find service on a different network. In such a scan, the UE may detect second network 906. The second network 906 may be another non-home network or may be a home network of the UE. However, during the period of time that the SIM is invalidated, the UE may not be able to establish a connection with the second network 906 (920), according to some embodiments. Such inability to connect to the network 906 may be due to the invalidity of the SIM. For example, the inability to connect may be unrelated to characteristics of the network 906 such as signal strength, signal quality, and/or identity of the network (e.g., whether the network is a home or roaming network for the UE, etc.). Thus, even though a second network 906 may be available, the UE 106 may not be able to access services using that network until the SIM is rebooted or otherwise becomes validated.

As discussed above, when a UE moved to a non-home network, there is a possibility to get authentication reject or SIM invalidation reject cause (e.g., attach reject 2, 3, 6, 7, or 8) due to any of the following reasons: a rogue or immature or test NW or no roaming agreement with the non-home network, among various possibilities. As illustrated in FIG. 9, such a rejection may cause the UE to stay in limited service till reboot, 12/24 hours, or SIM removal, even when service available on other available NW. Notably, SIM invalidation in response to some connection rejection messages is consistent with current standards. For example, 3GPP technical specification (TS) 24.301 states (in 5.4.2.5) that "Upon receipt of an AUTHENTICATION REJECT message, the UE shall set the update status to EU3 ROAMING NOT ALLOWED, delete the stored GUTI, TAI list, last visited registered TAI and KSIASME. The USIM shall be considered invalid until switching off the UE or the UICC containing the USIM is removed." Similarly, TS 24.301 states (in 5.5.1.2.5) that "ATTACH REJECT #2,3,6,7,8: The UE shall set the EPS update status to EU3 ROAMING NOT ALLOWED (and shall store it according to subclause 5.1.3.3) and shall delete any GUTI, last visited registered TAI and eKSI. The UE shall consider the USIM as invalid for EPS services and non-EPS services until switching off or the UICC containing the USIM is removed." Similar statements are also conveyed in 5G NR TS 24.501.

Potential results of invalidating a SIM include at least the following: UEs, including UEs of VIPs with special SIMs, may get no service in roaming until the SIM is replaced or validated; rogue NW or test NW may cause a roaming UE to enter a no service state until the SIM is replaced or validated; and/or a UE may not attempt to access a home NW or any other NW for 12-24 hours (or the UE/SIM is rebooted or power cycled) as SIM is invalid.

Figure 10:
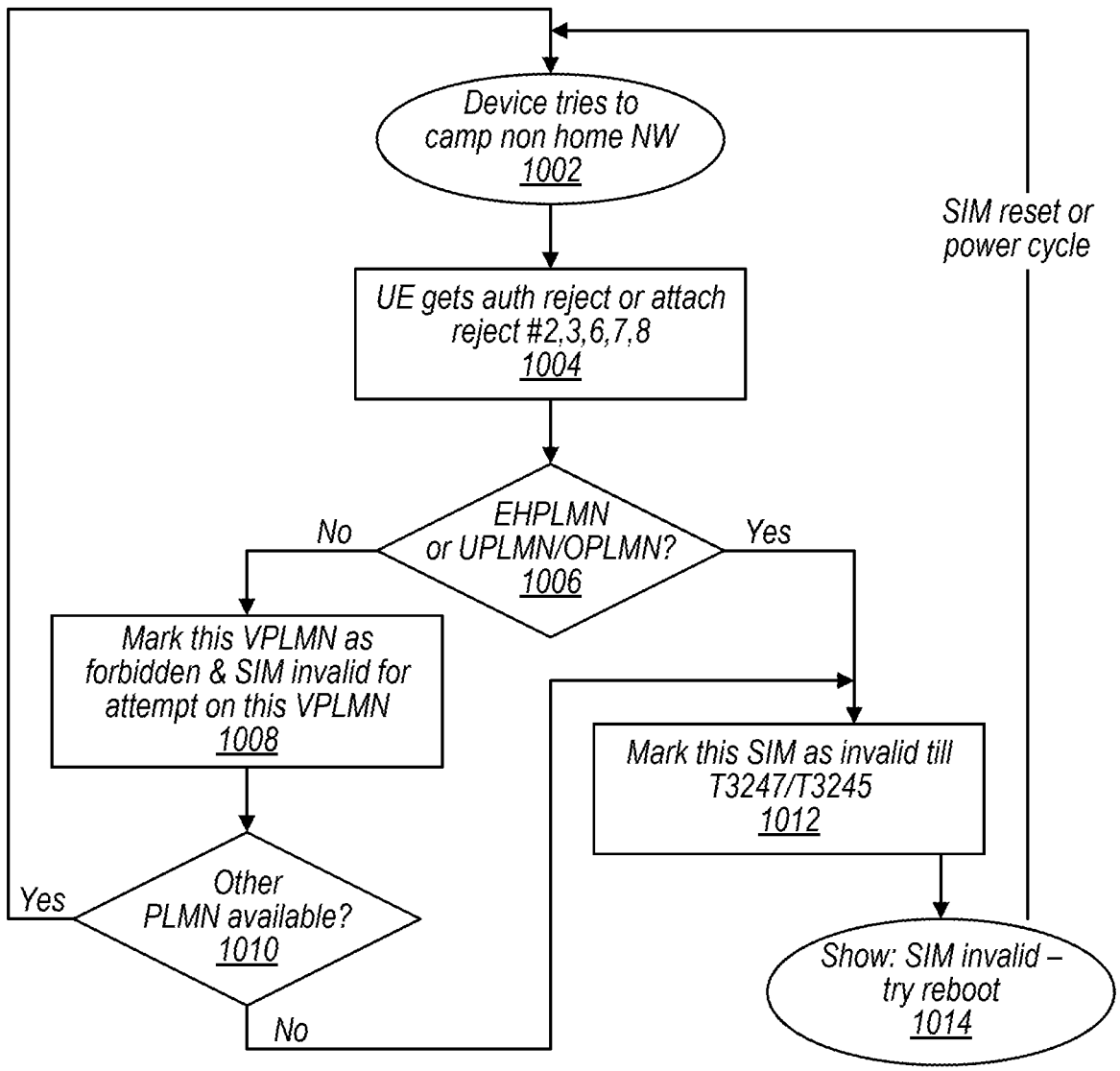

FIG. 10 illustrates an example flow chart of a UE determining whether to invalidate a SIM, according to some embodiments.

As shown, a UE may try to camp on a non-home NW (1002), e.g., as described above regarding 802 and/or 908-912. The UE may use a first SIM for the connection attempt (note that the term "first" is simply used as a label, and not an indication of priority or any characteristic of the first SIM). The non-home network may be referred to as a visited PLMN (VPLMN).

The UE may receive a connection rejection from the NW (1004), e.g., as described above regarding 804 and/or 914. The rejection may be or include an authentication reject or attach reject cause #2, 3, 6, 7, or 8.

The UE may determine characteristics of the network (1006), according to some embodiments. For example, the UE may determine whether the network is an equivalent home PLMN (EHPLMN) or a preferred PLMN (PPLMN). In other words, the UE may determine whether the network is on a list of preferred networks of the UE. Note that a PPLMN may include a user-preferred PLMN (UPLMN) and/or an operator-preferred PLMN (OPLMN), among various possibilities.

If the network is an EHPLMN or PPLMN (e.g., yes path from 1006), the UE may invalidate the first SIM (1012), according to some embodiments. For example, the UE may start one or more timers (e.g., T3245 which may be associated with an attach rejection or other connection rejection with integrity protection and/or T3247 which may be associated with a connection rejection without integrity protection) associated with the invalidation. Such a timer may be referred to as an invalidation timer. The UE may mark (e.g., treat, consider) the first SIM as invalid until expiration of the timer (e.g., or timers) or until the UE and/or first SIM is rebooted or power cycled. In other words, the UE may not use the (e.g., invalid) first SIM for any connection while an invalidation timer is pending.

Further, the UE may show a message or indication to the user indicating that the first SIM is invalid and/or suggesting that the user reboot the UE and/or first SIM (1014). In some embodiments, the indication may show that the UE is in a no service state, e.g., until the first SIM is validated.

If the network is neither an EHPLMN nor a PPLMN (e.g., no path from 1006), the UE may mark (e.g., treat, consider) this network as forbidden, e.g., for the first SIM, (1008), according to some embodiments. In other words, the UE may note in its memory that this network is not to be used with the first SIM, e.g., the first SIM is not to be used for further connection attempts with this network. Such a marking may be reset upon a reset of the first SIM and/or a power cycle/reboot of the UE. In some embodiments, manual selection to this network may not be allowed (e.g., or may be discouraged) for the first SIM. In some embodiments, further access attempts using a different SIM (e.g., a second SIM) may be permitted. In other words, while treating the first network as prohibited for the first SIM, the UE may make an attempt to access the first network using a second SIM.

The UE may determine whether one or more other networks is available (e.g., based on scanning for other networks) (1010), according to some embodiments.

If no other network is available (e.g., no path from 1010), the UE may mark the first SIM as invalid and/or notify the end user, e.g., as discussed above regarding 1012 and 1014.

If one or more other networks is available (e.g., yes path from 1010), the UE may attempt to camp on a different network, e.g., as described above regarding 1002. For example, if the UE detects EHPLMN or UPLMN/OPLMN coverage, the UE may attempt to camp normally on that PLMN. In some embodiments, the UE may attempt to camp on a second PLMN that is not an EHPLMN or PPLMN.

In one view, 1006, 1008, and 1010 may be considered an example embodiment of 806 of FIG. 8.

Figure 11:
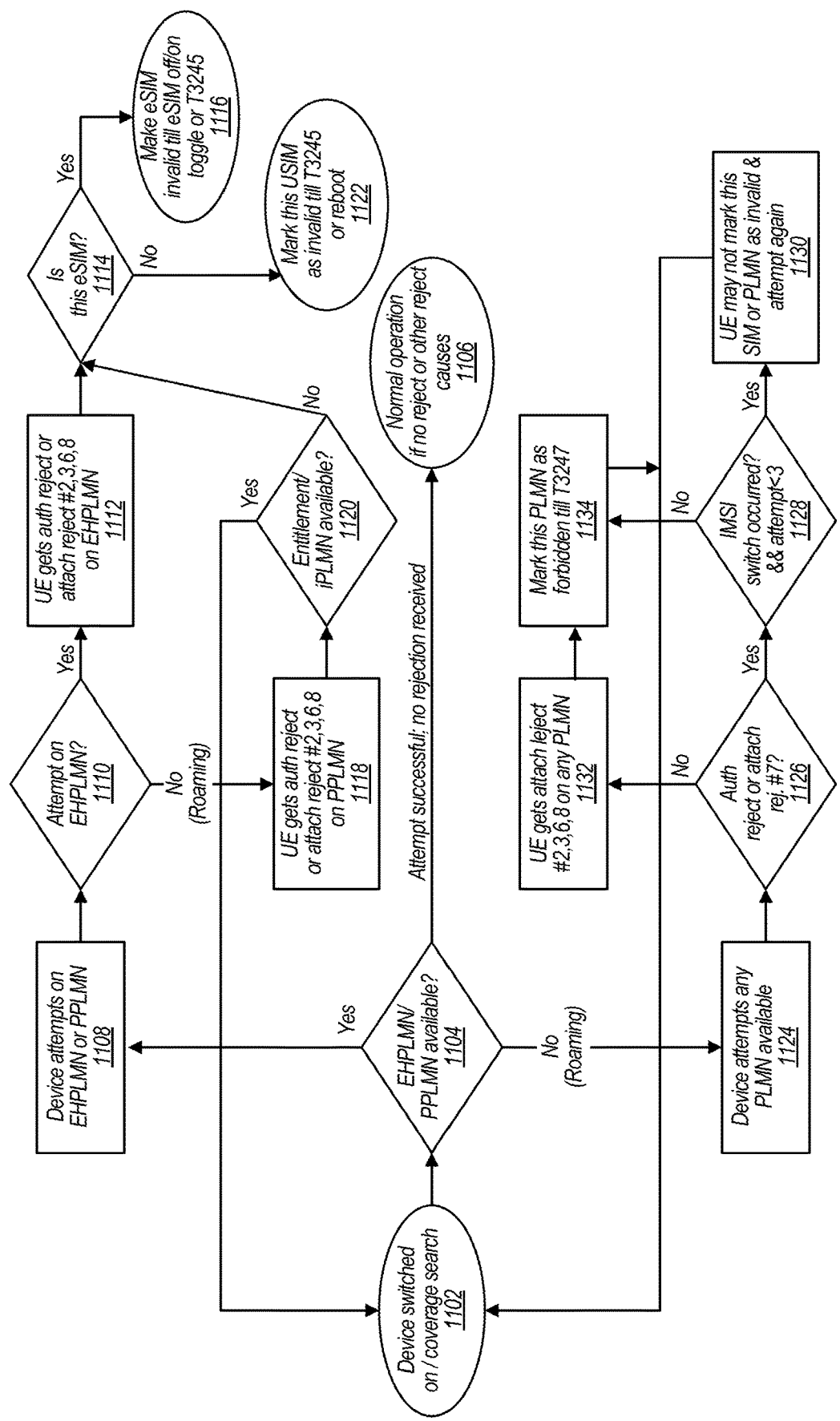

FIG. 11 illustrates an example in which integrity protection is provided.

A UE 106 may initiate a coverage search (1102), according to some embodiments. The coverage search may be initiated in response to powering on (e.g., booting the device), changing SIMs, exiting airplane mode, etc.

The UE 106 may determine whether an EHPLMN or PPLMN is available (1104), according to some embodiments. For example, the UE may scan for networks and/or take one or more measurements. Equivalent home networks (e.g., EHPLMN) may be listed in a list of all EHPLMN for the carrier (e.g., the home network of a UE). Similarly, preferred networks (e.g., PPLMN including UPLMN and OPLMN from the carrier) may be stored in a preferred network list. These lists of EHPLMN and PPLMN may be stored in memory of a UE, e.g., or memory of a SIM. Such lists may be updated (e.g., via an entitlement server of a network). Thus, to determine whether and EHPLMN or PPLMN is available, the UE may compare available networks to these lists. In some embodiments (e.g., as further discussed below), a UE may mark a SIM as invalid in response to a rejection from an EHPLMN, e.g., until expiration of timer T3245.

If an EHPLMN or PPLMN is found (yes path from 1104), the UE 106 may attempt to access such a network 100 (1108), according to some embodiments.

The UE 106 may determine whether the network 100 is an EHPLMN (1110). If the network is an EHPLMN (yes path from 1110), the UE may receive a connection rejection (e.g., an authentication rejection or an attach rejection (e.g., with cause 2, 3, 6, or 8)) from the EHPLMN (1112). Note that under some conditions the UE may not receive a rejection, and may instead proceed to access the network 100 according to normal operation (e.g., as shown at 1106).

The UE may determine a characteristic of the SIM, e.g., related to how the SIM may be reset or revalidated (1114), according to some embodiments. In other words, the UE may determine a SIM specific reset condition. For example, the UE may determine whether the SIM is an eSIM. Some types of SIMs (e.g., eSIM) may not be (e.g., easily) removed from a UE and reinserted, e.g., in order to be reset. In some embodiments, a SIM (e.g., an eSIM) being turned off and on (e.g., power cycled) and/or entering and/or exiting airplane mode, etc. may be considered as revalidating a SIM (e.g., even after a connection rejection and prior to expiration of a timer, e.g., T3245).

According to the SIM characteristic, the UE mark the SIM as invalid until the reset condition is reached. For example, if the SIM may be reset by an on/off toggle (e.g., yes path from 1114), the SIM may be marked as invalid until either the SIM is toggled or the timer (e.g., T3245) expires (1116). If the SIM may not be reset by an on/off toggle (e.g., no path from 1114), the SIM may be marked as invalid until either the UE or SIM is rebooted or the timer (e.g., T3245) expires (1122).

If the network is not an EHPLMN (no path from 1110, e.g., the network is a PPLMN and the UE is roaming), the UE may receive a connection rejection (e.g., an authentication rejection or an attach rejection (e.g., with cause 2, 3, 6, or 8)) from the PPLMN (1118). Note that under some conditions the UE may not receive a rejection, and may instead proceed to access the network 100 according to normal operation (e.g., as shown at 1106).

In response to the connection rejection, the UE 106 may determine whether an updated PPLMN list is available (1120), according to some embodiments. In some embodiments, if an updated for an PPLMN list is available, a UE may update the list using an entitlement server or similar server (yes path from 1120) and may proceed to perform another coverage search and/or access another PPLMN (e.g., as discussed above regarding 1102 and 1104).

If an updated list is not available (no path from 1120), the UE may mark the SIM as invalid until the SIM is reset, e.g., as discussed above regarding 1114, 1116, and 1122.

If no EHPLMN or PPLMN is available (no path from 1104, e.g., if the UE is roaming), the UE 106 may attempt to access an available PLMN (1124), according to some embodiments.

If the UE receives a connection rejection, the UE may determine a type of the connection rejection (1126), according to some embodiments. For example, the UE may determine whether the connection rejection is an authentication rejection or an attachment rejection with cause #7.

If the connection rejection is a rejection of a certain type (e.g., a first type which may include an authentication rejection and/or an attachment rejection with cause #7) (e.g., yes path from 1126), the UE may determine whether an identity switch (e.g., a change in international mobile subscriber identities (IMSI)) has occurred and/or if a threshold number of connection attempts has not been reached (1128), according to some embodiments. In some embodiments, attach rejections with cause #7 and/or authentication rejections may happen due to (e.g., changes in) roaming agreements and/or be related to multiple IMSIs associated with a SIM. In some embodiments, a UE may not invalidate a SIM if an identity switch happens (e.g., and/or a threshold number of attempts has not been reached). In some embodiments, the threshold number of attempts may be three attempts, among various possibilities. In some embodiments, 1128 may be evaluated as a yes if either of the conditions is true (e.g., an "or" condition). In some embodiments, 1128 may be evaluated as a yes only if both of the conditions are true (e.g., an "and" condition). To determine if the threshold number of attempts has been reached, the UE may consult a counter tracking a number of connection attempts. In some embodiments, such a counter may be specific to an individual PLMN. In some embodiments, such a counter may be common to all (e.g., non-preferred and non-equivalent home) PLMNs, or a subset of such PLMNs. In some embodiments, both a common counter and an individual counter may be used (e.g., with different thresholds, e.g., a threshold of three attempts for any individual PLMN and a threshold of 5 attempts for all PLMNs). Such a counter (or counters) may be reset if an IMSI switch occurs, or the counter(s) may be specific to an IMSI.

If an identity (e.g., IMSI) switch occurred and/or a threshold number of connection attempts has not been reached (e.g., yes path from 1128), the UE may perform another connection attempt (1130), according to some embodiments. The UE may not mark either the SIM or the PLMN as invalid or forbidden. The UE may increment a counter (e.g., common and/or individual) tracking the number of connection attempts. The next connection attempt may be performed as discussed above regarding 1102 and 1104.

If the connection rejection is not of the certain type (e.g., the connection rejection is not an authentication rejection or an attachment rejection with cause #7) (e.g., no path from 1126), the rejection may be an attachment rejection with cause 2, 3, 6, or 8 (1132). The UE may mark this PLMN as forbidden (e.g., invalidate this PLMN for a current SIM) (1134), according to some embodiments. The UE may start a timer and consider the PLMN invalid/forbidden until expiration of the timer (e.g., T3247), according to some embodiments. In some embodiments, SIM invalidation rejections (e.g., attachment rejection with cause 2, 3, 6, or 8) on a non EHPLMN/PPLMN may be due to a test NW, rogue NW, and/or various (e.g., unoptimized) NW configurations. Accordingly, instead of SIM invalidation, a UE may invalidate a network (e.g., marking a network as forbidden). In other words, the UE may invalidate the SIM only for a particular non EHPLMN/PPLMN. The UE may then proceed to perform another coverage search and/or another attempt to access a network (e.g., a different network) as described above regarding 1102 and 1104. TS 24.301 discusses invalidation of a based on a rejection. It will be appreciated that the standard may be updated to explicitly include invalidating the SIM for a particular network, as discussed herein.

If no identity switch occurred and/or a threshold number of connection attempts has been reached (e.g., no path from 1128), the UE may mark the network as forbidden and proceed to make another connection attempt as described above with respect to 1134, 1102, and 1104, according to some embodiments.

It will be appreciated that normal operation (e.g., 1106) can be reached from any connection attempt which is accepted (e.g., no connection rejection is received). In other words, 1106 may be reached instead of 1112, 1118, and/or 1124. 1106 is shown as connected to 1104 in order to simplify the illustration.

Figure 12:
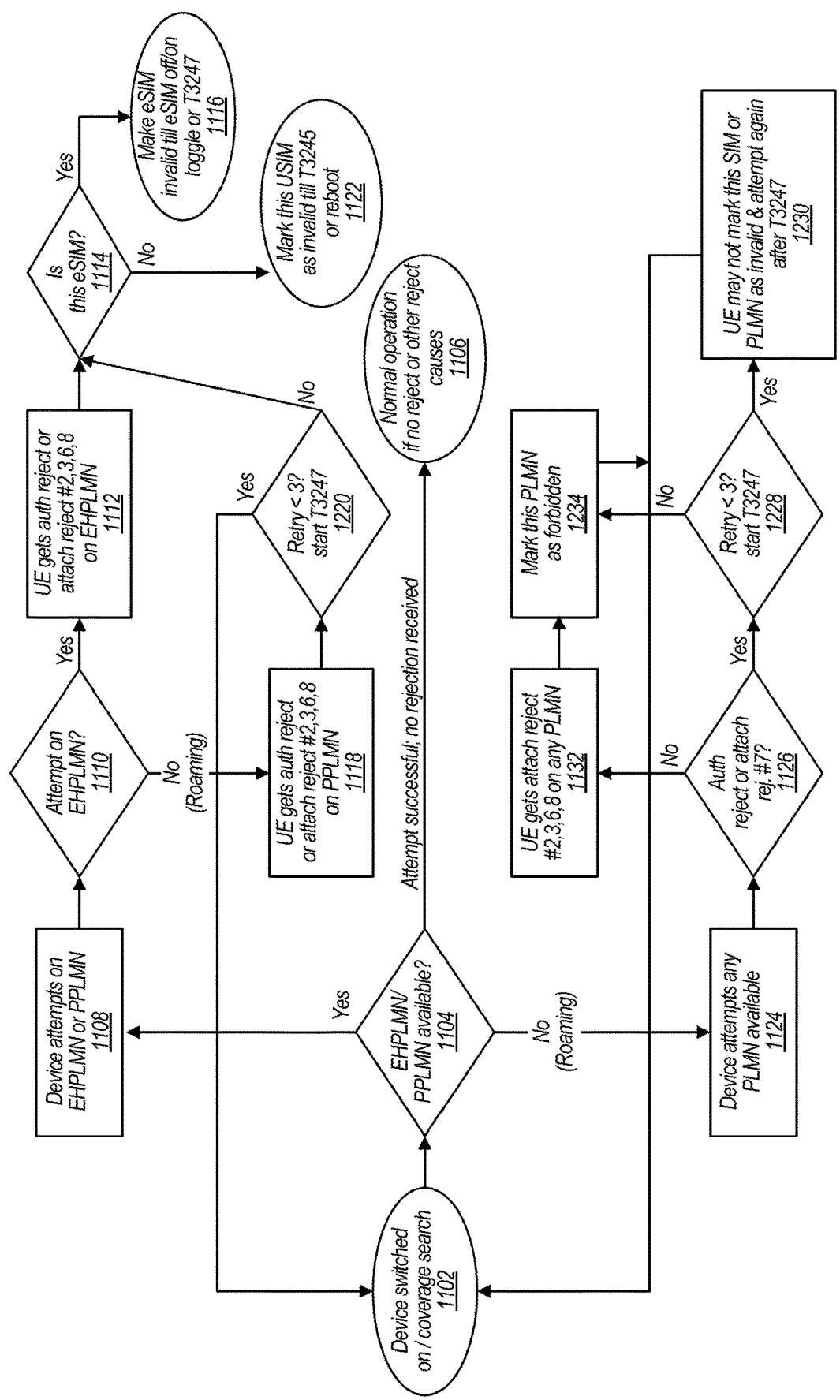

FIG. 12 illustrates an example in which integrity protection is not provided. FIG. 12 is similar to FIG. 11, however FIG. 12 may be applicable in locations where networks may send a connection rejection message before completing an integrity check and/or NAS security process during attach/registration (e.g., relative to FIG. 11). Many aspects of FIG. 12 may be similar to FIG. 11; various differences are discussed below.

If the UE finds that a PPLMN is available and attempts access on the PPLMN (e.g., yes path from 1104 and no path from 1110), the UE may receive a connection rejection (e.g., an authentication rejection or an attach rejection (e.g., with cause 2, 3, 6, or 8)) from the PPLMN (1118). In response to the connection rejection, the UE 106 may start a timer (e.g., T3247) and may determine whether a threshold number of connection attempts (e.g., retries) for the PPLMN is below a threshold number of attempts (1220), according to some embodiments.

In some embodiments, if the number of attempts is below the threshold (yes path from 1220), the UE may perform another connection attempt (e.g., and possibly may perform another coverage search/scan (e.g., as discussed above regarding 1102 and 1104). The UE may increment a counter (or counters) for the number of connection attempts. As discussed above, the counter may be specific to an individual PPLMN, according to some embodiments.

In some embodiments, if the number of attempts has reached the threshold (no path from 1220), the UE may mark the SIM as invalid until the SIM is reset, e.g., as discussed above regarding 1114, 1116, and 1122. Expiration of the timer (T3247) may reset the SIM.

If no EHPLMN or PPLMN is available (e.g., no path from 1104) and a connection rejection is an authentication rejection or an attachment rejection with cause #7 (e.g., yes path from 1126), the UE may start a timer (e.g., T3247) and may determine whether a threshold number of connection attempts (e.g., retries) for the PLMN is below a threshold number of attempts (1228), according to some embodiments.

If the number of attempts is below the threshold (e.g., yes path from 1228), the UE may perform another connection attempt after expiration of the timer (e.g., T3247) (1230), according to some embodiments. The UE may not mark either the SIM or the PLMN as invalid or forbidden. The UE may increment a counter (e.g., common and/or individual) tracking the number of connection attempts. The next connection attempt may be performed as discussed above regarding 1102 and 1104.

If the number of attempts has reached the threshold (e.g., no path from 1228), the UE may mark the PLMN as forbidden (1234), according to some embodiments. In some embodiments, the UE may mark the PLM as forbidden until the SIM is removed and/or rebooted. Forbidding (e.g., blocking) the PLMN in this way may reduce or avoid delay which could be caused by a further attempt to access the PLMN. In some embodiments, PLMN may be marked as forbidden, e.g., until expiration of the timer (e.g., T3247). The UE may then proceed to make another connection attempt (e.g., as discussed beginning with 1102 and 1104).

ADDITIONAL INFORMATION AND EXAMPLES

Implementing aspects of the methods of FIG. 8 (e.g., and/or other methods disclosed herein) may help reduce or avoid SIM invalidation in various scenarios. Examples of such scenarios are described below.

In a first example, rogue or test NWs (e.g., or various NW configurations) may cause denial of service (DOS), e.g., via a distributed DOS (DDoS) attack. These types of NWs may cause SIM invalidation rejections and may cause devices to stay in limited service ranging from 30 mins to 24 hours depending on factors such as integrity protection.

In a second example, new IMSI and 5G NR features may cause rejections. New device IMSI or new EHPLMN series for 5G NR may cause rejections (e.g., including connection rejections for SIMs that are valid) during early stage 5G NR deployments in SA and/or NSA modes.

In a third example, unoptimized or poorly configured 4G and/or 5G NR NWs may cause rejections. For example, unoptimized or poorly configured networks (e.g., potentially related to update of network release version, new technologies, etc.) may lead to connection rejections for valid SIMs. Similarly, such rejections may be observed when cloud based RAN and/or Non Public Networks are introduced.

A fourth example may include HLR/VLR coordination issues. There may be coordination issue between HLR and VLR which may temporarily cause connection rejections for valid SIMs. Accordingly, multiple roaming UEs may experience limited service.

A fifth example may include dormant SIM card handling. In some embodiments, the disclosed methods may also ensure that a dormant SIM card does not attempt multiple times, e.g., and will stay as invalid for most of the duration with 12-24 hours timer. The methods disclosed herein may ensure this by enabling timers (e.g., T3245) during possibility of a genuine case of invalid or dormant SIM card. For example, a dormant or invalid SIM may be invalidated for the duration of an invalidation timer.

Implementing aspects of the methods of FIG. 8 (e.g., and/or other methods disclosed herein) may also result in any or all of the following example effects.

A UE may avoid a no service state and/or reboot requirement, e.g., for executive and special SIM cards (e.g., cards with unlimited provisioning and many domestic and international roaming partners, e.g., for VIPs).

A UE may experience enhanced security against NAS Denial of Service from rogue or test NW. A UE supposed to operate within premises of a private and/or industrial networks (e.g., or any standalone non public network (NPN)) may thus be operational within required domain and not get invalidated by missed attempt to public network. For example, if such a UE attempts to access and is rejected by a public network, the SIM may not be invalidated but the public network may be forbidden/blocked. Thus, the UE may attempt access on the NPN without resetting the SIM or experiencing a delay associated with an invalid SIM.

A UE may be able to avoid or reduce out of service experience, e.g., in cases of growing economies, e.g., with various potentially less optimised NW configurations.

A UE may experience enhanced UE coverage performance continuity in roaming with multiple roaming partners, including in cases of poor coverage.

The techniques described herein may also or alternatively be used in conjunction with any of various countries, regions, deployment scenarios, etc., as desired.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   a processor configured to cause a user equipment device (UE) to:
   detect a first wireless network;
   attempt to access the first wireless network using a first subscriber identity module (SIM);
   receive, from the first wireless network, a connection rejection, wherein the connection rejection indicates invalidation of the first SIM; and
   determine, in response to the connection rejection, not to invalidate the first SIM based on a determination that the first wireless network is neither an equivalent home network nor a preferred network.

2. The apparatus of claim 1, wherein the processor is further configured to:
   start, in response to the connection rejection, an invalidation timer; and
   attempt to access a second wireless network using the first SIM while the invalidation timer is pending.

3. The apparatus of claim 1, wherein the connection rejection is an attach rejection.

4. The apparatus of claim 1, wherein the processor is further configured to cause the UE to mark the first wireless network as forbidden.

5. The apparatus of claim 4, wherein to mark the first wireless network as forbidden prevents further attempts to access the first wireless network using the first SIM.

6. The apparatus of claim 5, wherein to mark the first wireless network as forbidden permits further attempts to access the first wireless network using a second SIM.

7. A user equipment device (UE), comprising:
   a radio; and
   a processor operably connected to the radio and configured to cause the UE to:
   detect a first wireless network;
   initiate a first subscriber identity module (SIM);
   initiate, using the first SIM, a connection with the first wireless network;
   receive, from the first wireless network, a SIM invalidating connection rejection; and
   selectively determine, in response to the SIM invalidating connection rejection, whether to invalidate the first SIM based on a determination of whether the first wireless network is either an equivalent home network or a preferred network.

8. The UE of claim 7, wherein based on a determination that the first wireless network is an equivalent home network or a preferred network, the processor is configured to cause the UE to invalidate the first SIM.

9. The UE of claim 7, wherein, the determination whether to invalidate the first SIM is further based on a determination of whether another wireless network is available.

10. The UE of claim 7, wherein, based on a determination that the first wireless network is neither an equivalent home network nor a preferred network, the determination of whether to invalidate the first SIM comprises a determination to invalidate the first SIM.

11. The UE of claim 10, wherein the determination to invalidate the first SIM is further in response to a determination that no other wireless network is available.

12. The UE of claim 7, wherein, in response to a determination that a second wireless network is available and a determination that the first wireless network is neither an equivalent home network nor a preferred network, the processor is configured to cause the UE to not invalidate the first SIM.

13. The UE of claim 12, wherein, in response to the determination that the second wireless network is available, the processor is configured to cause the UE to initiate, using the first SIM, a connection with the second wireless network.

14. The UE of claim 7, wherein the processor is further configured to cause the UE to determine whether to block the first wireless network.

15. A method, comprising:
   at a user equipment device (UE):
   performing a search for coverage;
   determining that no equivalent home network or preferred network is available;
   attempting to access a first network using a first subscriber identity module (SIM);
   receiving, from the first network, a connection rejection;
   determining a type of the connection rejection; and
   determining, based on the type of the connection rejection:
   whether to block the first network; and
   whether to continue using the first SIM.

16. The method of claim 15, wherein, in response to a determination that the type of the connection rejection is a first type, the method further comprises:
   determining whether an identity change has occurred, wherein the determination of whether to block the first network is further based on said determining whether an identity change has occurred.

17. The method of claim 16, wherein, in response to determining that an identity change has occurred, the method comprises determining not to block the first network.

18. The method of claim 15, wherein, in response to a determination that the type of the connection rejection is an attach rejection with cause 2, 3, 6, or 8, the method comprises blocking the first network.

19. The method of claim 15, wherein, in response to a determination that the type of the connection rejection is a first type, the method further comprises:
   comparing a number of connection attempts to a threshold, wherein the determination of whether to block the first network is further based on the comparison.

20. The method of claim 19, wherein if the number of connection attempts is less than the threshold, the first network is not blocked.

* * * * *